(12) United States Patent
Huang et al.

(10) Patent No.: US 12,029,928 B2
(45) Date of Patent: Jul. 9, 2024

(54) SPRAYING SYSTEM OF BATTERY PACK, AND BATTERY PACK

(71) Applicant: CONTEMPORARY AMPEREX TECHNOLOGY CO., LIMITED, Fujian (CN)

(72) Inventors: Xiaoteng Huang, Fujian (CN); Wenli Wang, Fujian (CN); Jiarong Hong, Fujian (CN); Kaiyuan Mao, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 786 days.

(21) Appl. No.: 17/135,895

(22) Filed: Dec. 28, 2020

(65) Prior Publication Data

US 2021/0113871 A1    Apr. 22, 2021

Related U.S. Application Data

(63) Continuation of application No. PCT/CN2019/076314, filed on Feb. 27, 2019.

(30) Foreign Application Priority Data

Dec. 28, 2018 (CN) .......................... 201811624621.1

(51) Int. Cl.
   *A62C 3/07* (2006.01)
   *A62C 31/28* (2006.01)
   *A62C 37/00* (2006.01)
   (Continued)

(52) U.S. Cl.
   CPC ................ *A62C 3/07* (2013.01); *A62C 31/28* (2013.01); *A62C 37/00* (2013.01);
   (Continued)

(58) Field of Classification Search
   CPC ......... A62C 3/07; A62C 31/28; A62C 35/023; A62C 3/16; A62C 37/08; A62C 31/00;
   (Continued)

(56) References Cited

U.S. PATENT DOCUMENTS 5,657,824 A    8/1997  Sundholm
8,733,465 B1 *  5/2014  Flood .................. H01M 50/213
                                                    169/56
(Continued)

FOREIGN PATENT DOCUMENTS

CN    206063591 U    4/2017
CN    206822989 U *  1/2018
(Continued)

*Primary Examiner* — Qingzhang Zhou
(74) *Attorney, Agent, or Firm* — Scully, Scott, Murphy & Presser, P.C.

(57) ABSTRACT

The present application provides a battery pack and a spraying system thereof. The spraying system comprises: a spraying pipeline configured to circulate a fire-fighting fluid circulation, the spraying pipeline being capable of forming an opening after being heated; and a first gas storage portion configured to store a compressed gas, where the compressed gas in the first gas storage portion is capable of driving the fire-fighting fluid in the spraying pipeline to be discharged under the action of gas pressure. In the present application, the gas pressure of the compressed gas in the first gas storage portion can provide the power for discharging the fire-fighting fluid from the opening of the spraying pipeline, such that the fire-fighting fluid can be continuously discharged from the spraying pipeline, and there is a large flow rate in the discharging process, so as to ensure that the spraying system has a good spraying effect.

13 Claims, 7 Drawing Sheets

(51) Int. Cl.
   *H01M 10/42*     (2006.01)
   *H01M 10/625*    (2014.01)
   *H01M 50/202*    (2021.01)
   *H01M 50/204*    (2021.01)

(52) U.S. Cl.
   CPC ....... *H01M 10/425* (2013.01); *H01M 10/625* (2015.04); *H01M 50/202* (2021.01); *H01M 50/204* (2021.01); *H01M 2200/00* (2013.01); *H01M 2220/20* (2013.01)

(58) Field of Classification Search
   CPC ............. H01M 10/425; H01M 10/625; H01M 50/202; H01M 50/204; H01M 2200/00; H01M 2220/20; H01M 50/249; H01M 50/375; H01M 50/383; H01M 2200/10; H01M 10/42; Y02E 60/10
   See application file for complete search history.

(56) References Cited

U.S. PATENT DOCUMENTS

| | | | |
|---|---|---|---|
| 2010/0116515 | A1 | 5/2010 | Felten et al. |
| 2012/0168184 | A1* | 7/2012 | Enk, Sr. .................. A62C 5/02 169/14 |
| 2014/0170447 | A1 | 6/2014 | Woehrle et al. |
| 2018/0138494 | A1 | 5/2018 | Birt et al. |

FOREIGN PATENT DOCUMENTS

| | | |
|---|---|---|
| CN | 108762330 A | 11/2018 |
| EP | 0 774 997 B1 | 3/1999 |
| EP | 1 968 715 B1 | 7/2011 |
| EP | 2 704 802 B1 | 7/2018 |
| JP | 2017-147128 A | 8/2017 |

* cited by examiner

SPRAYING SYSTEM OF BATTERY PACK, AND BATTERY PACK

CROSS-REFERENCE TO RELATED APPLICATIONS

This application is a continuation of International Application No. PCT/CN2019/076314, filed on Feb. 27, 2019, which claims priority to Chinese Patent Application No. 201811624621.1, filed on Dec. 28, 2018. The disclosures of the aforementioned applications are hereby incorporated by reference in their entireties.

TECHNICAL FIELD

The present application relates to the technical field of energy storage devices, and in particular to a spraying system of a battery pack, and a battery pack.

BACKGROUND

At present, safety accidents of electric vehicles occur frequently, and one of the major factors causing the safety accidents of electric vehicles is the spontaneous combustion of batteries. The batteries include cases and unit batteries located inside the cases. As the battery energy density gradually increases, the chemical system of the unit batteries gradually develops to a high energy density, and the volume of the unit batteries also becomes larger. However, a unit battery with a high energy density releases a high-temperature heat flow when thermal failure occurs. After the high-temperature heat flow leaks, it is prone to burn when it comes into contact with air, and the battery pack burns when the heat flow spreads to an adjacent unit battery, which brings serious harm to the personal safety of passengers and a driver.

SUMMARY

In view of this, embodiments of the present application provide a spraying system of a battery pack and a battery pack, to solve the problem in the prior art of, if thermal runaway occurs in a unit battery, the spreading of a heat flow causing an adjacent unit battery to burn, which affects the personal safety of passengers.

An embodiment of the present application provides a spraying system of a battery pack, the spraying system comprising:
  a spraying pipeline configured to circulate a fire-fighting fluid, the spraying pipeline being capable of forming an opening after being heated; and
  a first gas storage portion configured to store a compressed gas,
  where the compressed gas in the first gas storage portion is capable of driving the fire-fighting fluid in the spraying pipeline to be discharged under the action of gas pressure.

Preferably, the spraying system further includes a liquid storage portion, where
  the compressed gas in the first gas storage portion is further capable of driving the fire-fighting fluid in the liquid storage portion to enter the spraying pipeline under the action of gas pressure.

Preferably, the first gas storage portion and the liquid storage portion are arranged separately but are in communication with each other, and the compressed gas in the first gas storage portion is capable of entering the liquid storage portion.

Preferably, the spraying system includes two liquid storage portions, where the two liquid storage portions are respectively in communication with two ends of the spraying pipeline; and
  the first gas storage portion is in communication with the two liquid storage portions.

Preferably, the spraying system includes two liquid storage portions and two first gas storage portions, where
  one end of each of the two liquid storage portions is respectively in communication with either end of the spraying pipeline, and the other end of each of the two liquid storage portions is respectively in communication with either of the two first gas storage portions.

Preferably, the spraying system includes one liquid storage portion and one first gas storage portion, and further includes one second gas storage portion, where
  one end of the spraying pipeline is in communication with the liquid storage portion, and the other end thereof is in communication with the second gas storage portion.

Preferably, a flow valve is provided between the first gas storage portion and the liquid storage portion; and
  a one-way valve is provided between the first gas storage portion and the liquid storage portion.

Preferably, a flow valve is provided between the first gas storage portion and the liquid storage portion, and a flow valve is provided between the second gas storage portion and the spraying pipeline; and
  a one-way valve is provided between the first gas storage portion and the liquid storage portion, and the one-way valve is provided between the second gas storage portion and the spraying pipeline.

Preferably, the spraying system includes a fire-fighting fluid storage device, where the fire-fighting fluid storage device includes a tank provided with a fluid inlet and a fluid outlet;
  the fluid inlet is located above the fluid outlet; and
  an inner cavity of the tank is configured to store a fire-fighting fluid and a compressed gas, and the fire-fighting fluid in the inner cavity of the tank is capable of being discharged from the fluid outlet under the action of the compressed gas.

Preferably, the spraying system includes a fire-fighting fluid storage device, the fire-fighting fluid storage device comprising:
  a tank having an inner cavity; and
  a partition member located in the inner cavity of the tank, the partition member dividing the tank into a liquid storage portion and the first gas storage portion,
  where the liquid storage portion has a fluid outlet, the fluid outlet being in communication with the spraying pipeline, and the first gas storage portion is configured to have a fluid inlet; and
  the partition member is capable of driving the fire-fighting fluid in the liquid storage portion to move toward the fluid outlet under the action of the compressed gas in the first gas storage portion.

Preferably, the partition member includes a partition plate and is capable of moving relative to an inner wall of the tank under the action of the compressed gas in the first gas storage portion, to push the fire-fighting fluid in the liquid storage portion to move toward the fluid outlet; and
  a slidable sealing member is provided between an outer peripheral wall of the partition plate and the inner wall of the tank.

Preferably, the partition member includes a diaphragm, which is capable of expanding under the action of the compressed gas in the first gas storage portion, to push the fire-fighting fluid in the liquid storage portion to move toward the fluid outlet.

Preferably, the liquid storage portion and the first gas storage portion are distributed in a lengthwise direction L of the tank, and the partition member is capable of moving in the lengthwise direction L of the tank.

Preferably, the liquid storage portion and the first gas storage portion are distributed in a height direction H of the tank, and the liquid storage portion is located below the first gas storage portion; and the partition member is capable of moving in the height direction H of the tank.

Preferably, the fire-fighting fluid in the spraying pipeline and the liquid storage portion is fluorinated liquid.

Moreover, an embodiment of the present application also provides a battery pack, comprising:

a housing having an inner cavity;
a unit battery provided in the inner cavity of the housing, the unit battery being provided with an explosion-proof valve; and
a spraying system, which is the spraying system as described above,
where the spraying pipeline of the spraying system is arranged corresponding to the explosion-proof valve.

In the present application, if thermal runaway occurs in a unit battery and a heat flow is discharged from the explosion-proof valve thereof, and the spraying pipeline can be heated at the explosion-proof valve under the action of the heat flow, to form an opening, such that the fire-fighting fluid in the spraying pipeline is discharged from the opening to prevent the heat flow from spreading.

Moreover, in the early stage of the forming of the opening of the spraying pipeline, the fire-fighting fluid can be discharged from the opening under the action of its own hydraulic pressure, and whereas in the later stage of the forming of the opening of the spraying pipeline, the power for spraying the fire-fighting fluid from opening decreases as the hydraulic pressure of the fire-fighting fluid decreases. In the present application, after the first gas storage portion is provided, the gas pressure of the compressed gas in the first gas storage portion can provide the power for discharging the fire-fighting fluid from the opening of the spraying pipeline, such that the fire-fighting fluid can be continuously discharged from the spraying pipeline, and there is a large flow rate in the discharging process, so as to ensure that the spraying system has a good spraying effect.

BRIEF DESCRIPTION OF THE DRAWINGS

In order to illustrate the technical solutions in the embodiments of the present application more clearly, a brief introduction to the drawings required for the embodiments will be provided below. Obviously, the drawings in the following description are merely some of the embodiments of the present application, and those of ordinary skill in the art would also have been able to obtain other drawings according to these drawings without involving any inventive effort.

REFERENCE NUMERALS

1—Spraying system;
11—Spraying pipeline;
12—Fire-fighting fluid storage device;
121—Liquid storage portion;
   121a—Fluid outlet;
   121b—First planar portion;
   121c—Second planar portion;
   121d—Inclined portion;
122—First gas storage portion;
   122a—Fluid inlet;
123—Partition member;
124—Tank;
125—Mounting portion;
   125a—First mounting hole;
   125b—Second mounting hole;
13—Second gas storage portion;
14—One-way valve;
   141—Valve body;
   142—Elastic sheet;
   143—Connecting end
15—Connecting pipeline;
16—Connector portion;
2—Unit battery;
   20—Explosion-proof valve.

DESCRIPTION OF EMBODIMENTS

In order to better understand the technical solutions of the present application, embodiments of the present application are described in detail below with reference to the accompanying drawings.

It should be clear that the described embodiments are merely some of rather than all the embodiments of the present application. All the other embodiments obtained by a person of ordinary skill in the art based on the embodiments of the present application without any creative effort shall fall within the scope of protection of the present application.

The terms used in the embodiments of the present application are merely for the purpose of describing specific embodiments, and are not intended to limit the present application. The terms "a/an", "said", and "the" in the singular form used in the embodiments of the present application and the appended claims are also intended to include the plural form unless otherwise clearly indicated in the context.

It should be understood that the term "and/or" used herein is only an association relation describing associated objects, which means that there may be three relations, for example, A and/or B may represent three situations: A exists alone, both A and B exist, and B exists alone. In addition, the character "/" herein generally indicates that the associated previous and next objects are in the relationship of "or".

It should be noted that the orientation terms such as "upper", "lower", "left" and "right" described in embodiments of the present application are described from the angle shown in the accompanying drawings, and should not be construed as limiting the embodiments of the present application. In addition, in the context, it also needs to be understood that when it is mentioned that an element is connected to an "upper" or "lower" portion of another element, it can not only be directly connected to the "upper" or "lower" portion of the another element, but also indirectly connected to the "upper" or "lower" portion of the another element via an intermediate element.

When thermal runaway occurs in a cell of a battery pack, it is likely to cause the battery pack to burn, which affects the safety of the vehicle and passengers. In the present application, a spraying system is additionally provided in the battery pack to improve the safety of the battery pack.

Figure 1:
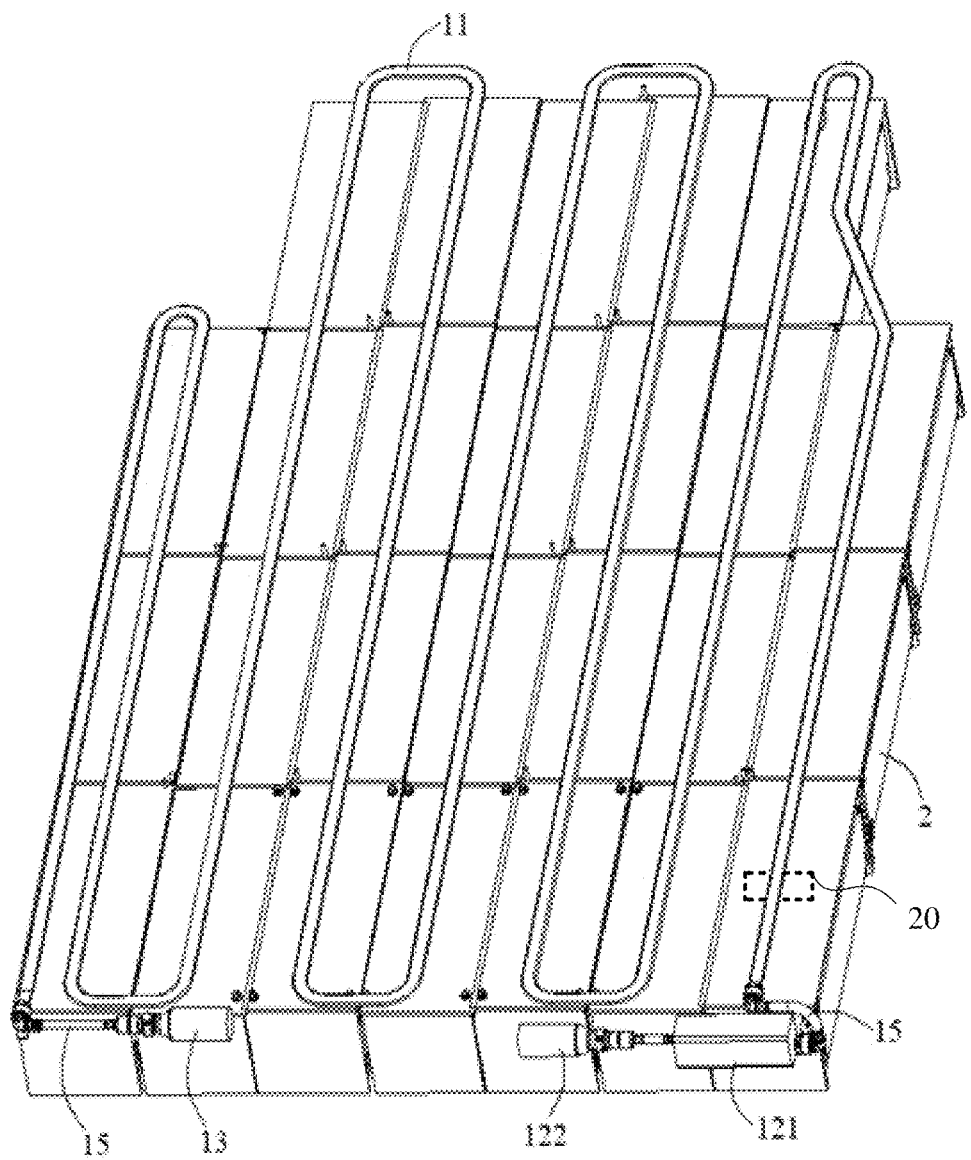
FIG. 1 is a schematic structural diagram of a battery pack provided by the present application with a case removed.
Figure 2:
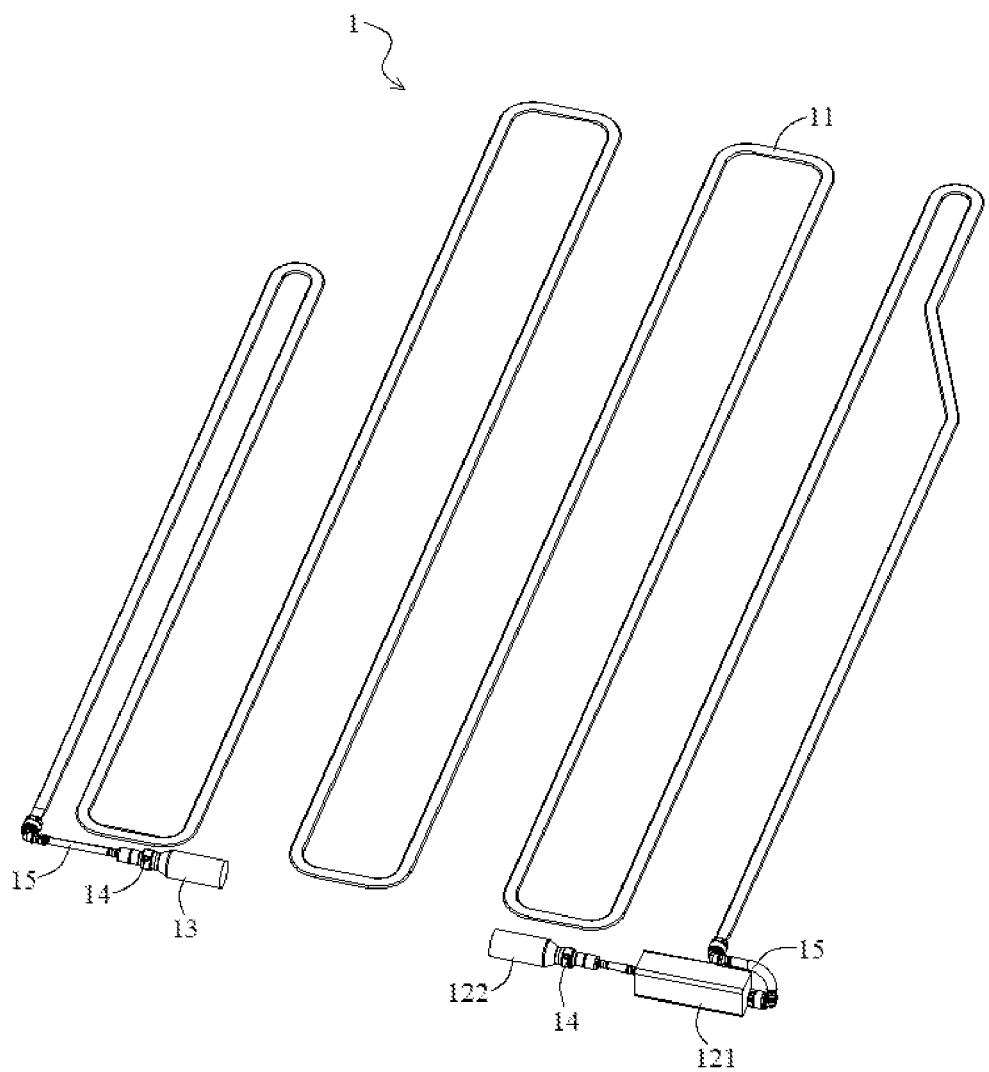
FIG. 2 is a schematic structural diagram of a first specific embodiment of a spraying system in FIG. 1.
Figure 3:
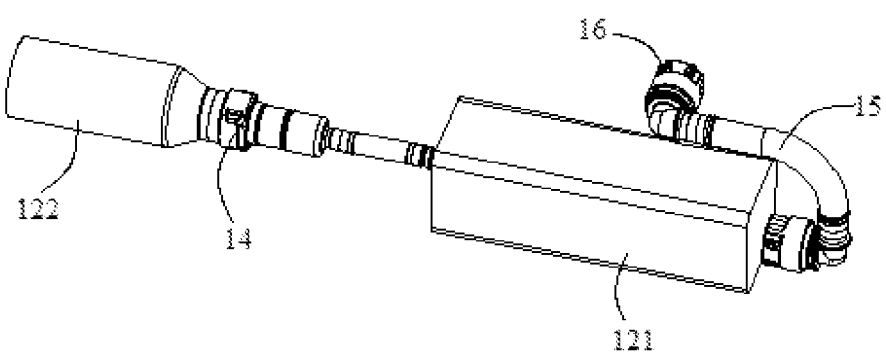
FIG. 3 is a schematic structural diagram of a liquid storage portion and a first gas storage portion connected to each other in FIG. 2.
Figure 4:
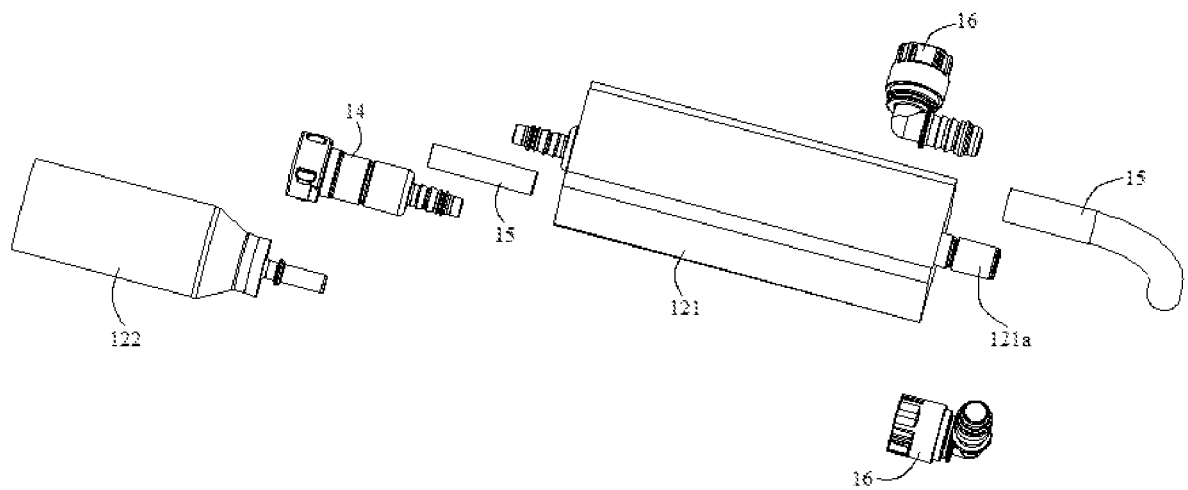
FIG. 4 is an exploded view of FIG. 3.
Figure 5:
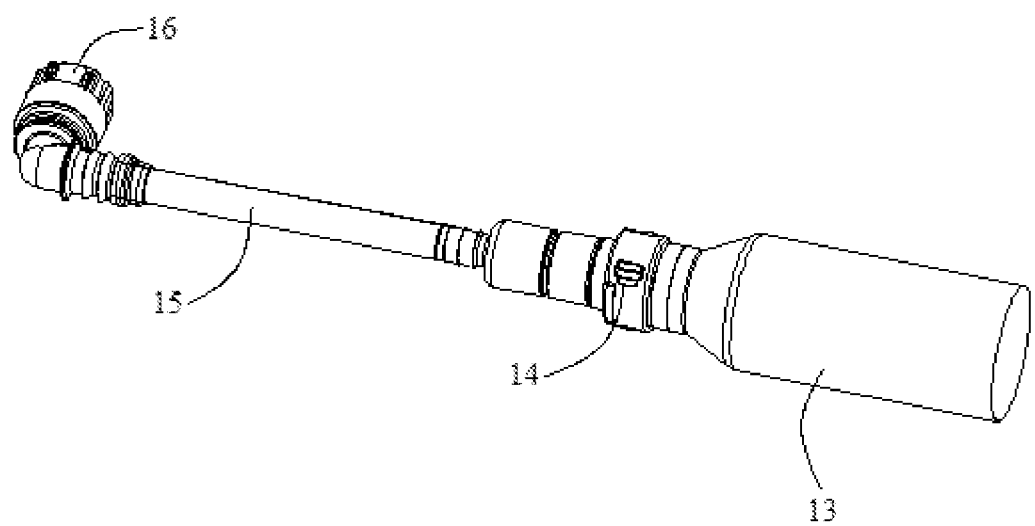
FIG. 5 is a schematic structural diagram of a second gas storage portion and a connecting pipeline connected to each other in FIG. 2.
Figure 6:
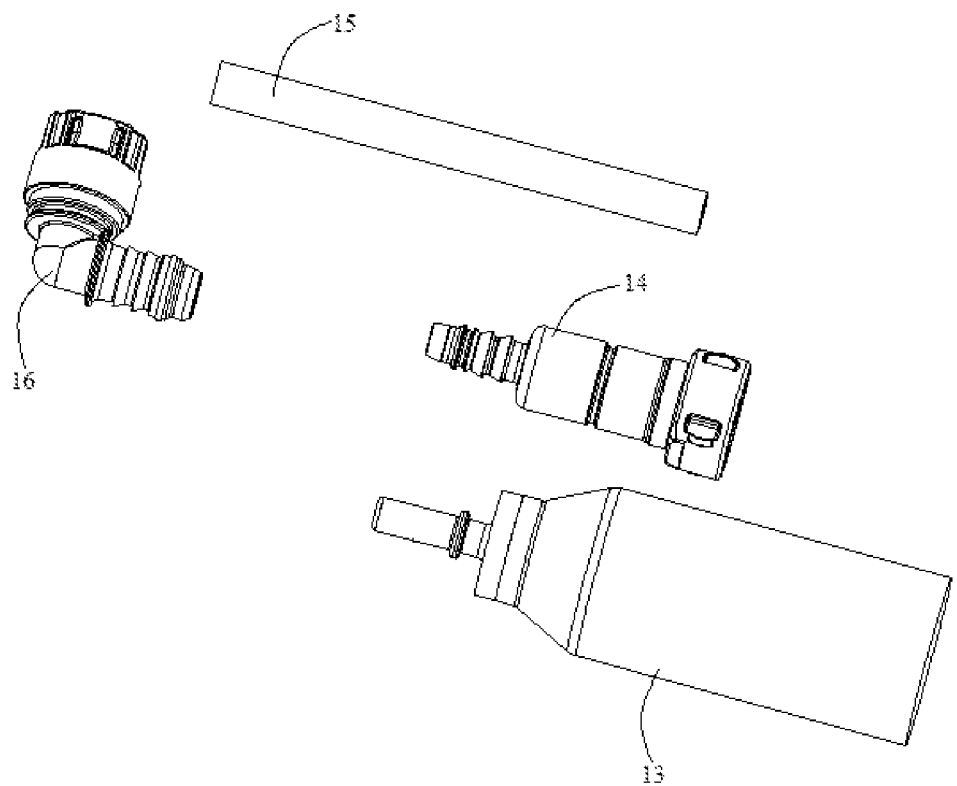
FIG. 6 is an exploded view of FIG. 5.
Figure 7:
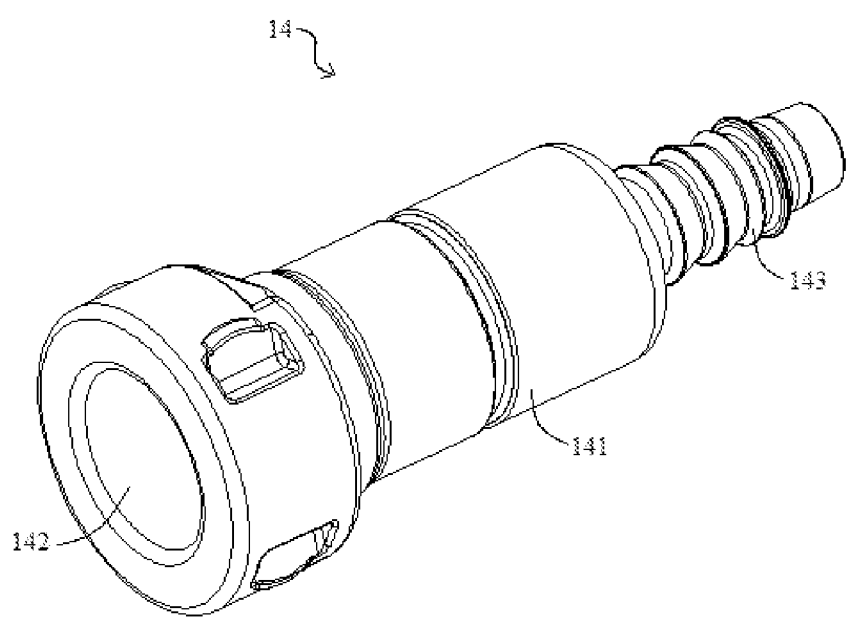
FIG. 7 is a schematic structural diagram of a one-way valve in FIG. 6.

Reference is made to FIGS. 1-7, where FIG. 1 is a schematic structural diagram of a battery pack provided by the present application with a case removed; FIG. 2 is a schematic structural diagram of a first specific embodiment of a spraying system in FIG. 1; FIG. 3 is a schematic structural diagram of a liquid storage portion and a first gas storage portion connected to each other in FIG. 2; FIG. 4 is an exploded view of FIG. 3; FIG. 5 is a schematic structural diagram of a second gas storage portion and a connecting pipeline connected to each other in FIG. 2; FIG. 6 is an exploded view of FIG. 5; and FIG. 7 is a schematic structural diagram of a one-way valve in FIG. 6.

An embodiment of the present application provides a battery pack, comprising: a housing (not shown in the figures), the housing having an inner cavity; and one or more unit batteries 2, the unit batteries 2 being located in the inner cavity of the housing. When multiple unit batteries 2 are included, the unit batteries 2 are arranged in a preset pattern and placed in the inner cavity of the housing. Moreover, in the battery pack, each unit battery 2 is provided with an explosion-proof valve. When thermal runaway occurs in the unit battery 2, a high-temperature and high-pressure heat flow is generated therein, and the explosion-proof valve is used to discharge the heat flow to reduce the risk of explosion of the unit battery 2. When the heat flow is discharged from the explosion-proof valve, the high-temperature heat flow may cause an adjacent unit battery 2 to burn. In order to reduce the risk of causing, if thermal runaway occurs in a certain unit battery, the adjacent unit battery 2 to burn, a spraying system 1 is additionally provided in the battery pack in the present application, to reduce the spreading of the heat flow and improve the safety of the battery pack.

Specifically, as shown in FIG. 1, the spraying system 1 includes a spraying pipeline 11. The spraying pipeline 11 is arranged corresponding to the explosion-proof valves of the unit batteries 2, that is, the spraying pipeline 11 passes through each unit battery 2 and is located directly above the explosion-proof valve in each unit battery 2. The spraying pipeline 11 is used to circulate a fire-fighting fluid, and the spraying pipeline 11 can form an opening after being heated. The opening is used to discharge the fire-fighting fluid.

Moreover, as shown in FIG. 2, the spraying system 1 further includes a first gas storage portion 122. The first gas storage portion 122 is used to store a compressed gas, and the compressed gas in the first gas storage portion 122 can drive the fire-fighting fluid in the spraying pipeline 11 to be discharged under the action of gas pressure.

In the present application, if thermal runaway occurs in a unit battery 2 and a heat flow is discharged from the explosion-proof valve thereof, and the spraying pipeline 11 can be heated at the explosion-proof valve under the action of the heat flow, to form an opening, such that the fire-fighting fluid in the spraying pipeline 11 is discharged from the opening to prevent the heat flow from spreading.

Moreover, in the early stage of the forming of the opening of the spraying pipeline 11, the fire-fighting fluid can be discharged from the opening under the action of its own hydraulic pressure, and whereas in the later stage of the forming of the opening of the spraying pipeline 11, the power for spraying the fire-fighting fluid from opening decreases as the hydraulic pressure of the fire-fighting fluid decreases. In the present application, after the first gas storage portion 122 is provided, the gas pressure of the compressed gas in the first gas storage portion 122 can provide the power for discharging the fire-fighting fluid from the opening of the spraying pipeline 11, such that the fire-fighting fluid can be continuously discharged from the spraying pipeline 11, and there is a large flow rate in the discharging process, so as to ensure that the spraying system 1 has a good spraying effect.

The fire-fighting fluid in the present application includes fluorinated liquid. After being sprayed from the spraying pipeline 11, the fluorinated liquid can chemically react with the heat flow from the unit battery 2, thereby functioning to absorb heat and prevent heat diffusion. In addition, the compressed gas in the present application may be incombustible gas such as helium, nitrogen, and argon, which can not only provide the power for discharging the fire-fighting fluid from the spraying pipeline 11, but can also have an air isolation function to a certain extent when the compressed gas is discharged from the opening of the spraying pipeline 11, thereby having an auxiliary fire-fighting function.

In addition, when the heating temperature of the spraying pipeline 11 reaches 500° C. or higher (for example, 660° C.), the spraying pipeline 11 can form an opening at the heated position. When thermal runaway occurs in a unit battery 2 of the battery pack, a heat flow is sprayed from the explosion-proof valve of the unit battery 2. The temperature of the heat flow is 500° C. or higher, which enables the spraying pipeline 11 to form an opening. After the spraying pipeline 11 is impacted by the heat flow, there is a partial rupture or complete breaking at the impacted position, no matter how the spraying pipeline 11 ruptures, the opening can realize the discharge of the fire-fighting fluid as long as the opening is formed.

Further, as shown in FIG. 2, the spraying system 1 further includes a liquid storage portion 121. The liquid storage portion 121 stores the fire-fighting fluid. Moreover, the compressed gas in the first gas storage portion 122 can also drive the fire-fighting fluid in the liquid storage portion 121 to enter the spraying pipeline 11 under the action of gas pressure, that is, the liquid storage portion 121 is in communication with the spraying pipeline 11.

In this embodiment, if thermal runaway occurs in the unit battery 2 and the heat flow is discharged from the explosion-proof valve, during the discharging of the fire-fighting fluid in the spraying pipeline 11 from the opening, under the action of the gas pressure of the compressed gas in the first gas storage portion 122, the fire-fighting fluid in the liquid storage portion 121 enters the spraying pipeline 11 to supplement the spraying pipeline 11 with the fire-fighting fluid, and the fire-fighting fluid is further discharged from the opening of the spraying pipeline 11 to further prevent the spreading of the heat flow.

Therefore, in the spraying system 1, after the first gas storage portion 122 and the liquid storage portion 121 are provided, not only the fire-fighting fluid in the spraying pipeline 11 can have a spraying function, but also the fire-fighting fluid stored in the liquid storage portion 121 can also be discharged to have a spraying function, thereby greatly improving the spraying effect, reducing the risk of the spreading of the heat flow if thermal runaway occurs in the unit battery, and improving the safety of the battery pack.

In a first specific embodiment, as shown in FIG. 2, the first gas storage portion 122 and the liquid storage portion 121 described above are arranged separately, but are in communication with each other. Therefore, the compressed gas in the first gas storage portion 122 can enter the liquid storage portion 121, such that under the action of the gas pressure of the compressed gas, the fire-fighting fluid in the liquid storage portion 121 is pushed into the spraying pipeline 11.

In this embodiment, one end (the right end shown in FIG. 2) of the spraying pipeline 11 is in communication with the liquid storage portion 121, and the other end (the left end shown in FIG. 2) thereof is closed. When thermal runaway occurs in a unit battery 2, an opening is formed between the right and left ends of spraying pipeline 11. The fire-fighting fluid on two sides of the opening can be discharged from the opening, and at the same time, the compressed gas in the first gas storage portion 122 can also drive the fire-fighting fluid in the liquid storage portion 121 to enter the spraying pipeline 11 and be discharged from the opening, that is, the fire-fighting fluid can be continuously discharged from the right side of the opening.

In a second specific embodiment, the spraying system 1 includes two liquid storage portions 121, and the two liquid storage portions 121 are respectively in communication with two ends of the spraying pipeline 11. Moreover, the first gas storage portion 122 is in communication with the two liquid storage portions 121. That is, the first gas storage portion 122 in this embodiment has at least two gas outlets, and the two gas outlets are respectively in communication with the two liquid storage portions 121, such that the compressed gas in the first gas storage portion 122 can enter the two liquid storage portions 121.

In this embodiment, if thermal runaway occurs in a certain unit battery 2 of the battery pack and a heat flow is discharged, the spraying pipeline 11 forms, under the action of the heat flow, an opening corresponding to the explosion-proof valve of the unit battery 2. Since both ends of the spraying pipeline 11 are in communication with the liquid storage portions 121, the fire-fighting fluid can enter the spraying pipeline 11 from both ends of the spraying pipeline 11, and the fire-fighting fluid that enters the spraying pipeline 11 from both ends of the spraying pipeline 11 can be discharged from the opening, so that the discharge flow rate of the fire-fighting fluid is further increased, and the fire-fighting fluid can be discharged quickly no matter at which position of the spraying pipeline 11 the opening is formed, thereby improving the response speed.

In a third specific embodiment, the spraying system 1 includes two liquid storage portions 121 and two first gas storage portions 122, and one end of each of the two liquid storage portions 121 is respectively in communication with either end of the spraying pipeline 11, and the other end of each of the two liquid storage portions 121 is respectively in communication with either of the two first gas storage portions 122.

In this embodiment, the two ends of the spraying pipeline 11 are each connected to a structure shown in FIG. 3, that is, the two liquid storage portions 121 connected to the two ends of the spraying pipeline 1 are powered by different first gas storage portions 122, such that the power for the two liquid storage portions can be controlled independently. Therefore, it is helpful to rationally adjust the gas pressures of the two first gas storage portions 122 according to the different positions of the opening of the spraying pipeline 11, such that they can provide different gas pressures, and the fire-fighting fluid sprayed from the opening thus has a rational flow rate.

In a fourth specific embodiment, as shown in FIG. 2, the spraying system 1 includes one liquid storage portion 121 and one first gas storage portion 122, and the spraying system 1 further includes one second gas storage portion 13. One end of the spraying pipeline 11 is in communication with the liquid storage portion 121, and the other end thereof is in communication with the second gas storage portion 13.

In this embodiment, if thermal runaway occurs in a certain unit battery 2 of the battery pack and a heat flow is discharged, the spraying pipeline 11 forms, under the action of the heat flow, an opening corresponding to the explosion-proof valve of the unit battery 2. The compressed gas in the first gas storage portion 122 is used to drive the fire-fighting fluid in the liquid storage portion 121 to enter the spraying pipeline 11, and to drive the fire-fighting fluid at one end of the opening in the spraying pipeline 11 to be discharged from the opening; at the same time, the compressed gas in the second gas storage portion 13 is used to drive the fire-fighting fluid at the other end of the opening in the driving spraying pipeline 12 to be discharged from the opening. In this embodiment, as shown in FIGS. 2 and 3, a flow valve is provided between the first gas storage portion 122 and the liquid storage portion 121, and a flow valve is provided between the second gas storage portion 13 and the spraying pipeline 11. When thermal runaway occurs in a certain unit battery of the battery pack and a heat flow is discharged, the spraying pipeline 11 forms, under the action of the heat flow, an opening corresponding to the explosion-proof valve of the unit battery. The compressed gas in the first gas storage portion 122 enters the liquid storage portion 121 through the flow valve, to drive the fire-fighting fluid in the liquid storage portion 121 to enter the spraying pipeline 11 for spraying; at the same time, the compressed gas in the second gas storage portion 13 passes through the flow valve and drives the fire-fighting fluid in the spraying pipeline 11 to be discharged from the opening of the spraying pipeline 11.

Specifically, a flow valve is provided between the first gas storage portion 122 and the liquid storage portion 121 in communication therewith, and a flow valve is provided between the second gas storage portion 13 and the spraying pipeline 11. In this embodiment, through the provision of the flow valves, the flow rates of the compressed gas discharged from the first gas storage portion 122 and the second gas storage portion 13 can be controlled, thereby controlling the power output by the two gas storage portions to adjust the flow rate and the flow velocity of the sprayed fire-fighting fluid.

In addition, as shown in FIG. 2, a one-way valve 14 is also provided between the first gas storage portion 122 and the liquid storage portion 121. The one-way valve 14 enables the compressed gas to flow only from the first gas storage portion 122 to the liquid storage portion 121, and the fire-fighting fluid in the liquid storage portion 121 cannot flow back into the first gas storage portion 122. Moreover, a one-way valve 14 is also provided between the second gas storage portion 13 and the spraying pipeline 11. The one-way valve 14 enables the compressed gas in the second gas storage portion 13 to enter the spraying pipeline 11, and the fire-fighting fluid in the spraying pipeline 11 cannot flow back into the second gas storage portion 13.

Specifically, as shown in FIG. 7, the one-way valve 14 includes a valve body 141. The valve body 141 has a valve cavity, and the compressed gas can flow in the valve cavity. Moreover, the valve cavity of the one-way valve 14 is further provided with an elastic sheet 142, and the elastic sheet 142 is provided at one end of the one-way valve 14 that is close to the first gas storage portion 122 or the second gas storage portion 13. The elastic sheet 142 can block the valve cavity, and the elastic sheet 142 can also be opened under the action of an external force to unblock the valve cavity. Moreover, the one-way valve 14 is connected to the first gas storage portion 122 or the second gas storage portion 13 in an inserted manner.

Therefore, in this embodiment, taking the one-way valve 14 between the first gas storage portion 122 and the liquid storage portion 121 as an example, when the one-way valve 14 is connected to the first gas storage portion 122 in an inserted manner, the elastic sheet 142 can be opened under the action of an insertion connector in the first gas storage portion 122, such that the one-way valve 14 is in an unblocked state, and the compressed gas in the first gas storage portion 122 can enter the liquid storage portion 121. When the insertion connection between the first gas storage portion 122 and the one-way valve 14 is released (the insertion connector of the first gas storage portion 122 is pulled out of the one-way valve 14), the elastic sheet 142 is restored to the blocked state under the action of a resilient force, such that the one-way valve 14 is in the blocked state, and the fire-fighting fluid in the liquid storage portion 121 cannot flow back.

Moreover, the one-way valve 14 further includes a connecting end 143. The connecting end 143 is an insertion connector structure, so that it can be connected to another component in an inserted manner.

In another aspect, the spraying system 1 further includes a plurality of connecting pipelines 15 and a plurality of connector portions 16, where, as shown in FIGS. 3 and 4, there is a connecting pipeline 15 between the first gas storage portion 122 and the liquid storage portion 121, where one end of the connecting pipeline 15 is connected to the connecting end 143 of the one-way valve 14, and the other end thereof being in communication with a gas inlet of the liquid storage portion 121. Moreover, there is a connecting pipeline 15 between the liquid storage portion 121 and the spraying pipeline 11, the connecting pipeline 15 may be a bent structure to adapt to the installation environment of the liquid storage portion 121, and two ends of the connecting pipeline 15 are connected to the connector portions 16, where one of the connector portions 16 is connected to a fluid outlet 121a of the liquid storage portion 121 in an inserted manner, and the other connector portion 16 is connected to the spraying pipeline 11 in an inserted manner.

As shown in FIGS. 5 and 6, there is a connecting pipeline 15 between the second gas storage portion 13 and the spraying pipeline 11, where one end of the connecting pipeline 15 is connected to the connecting end 143 of the one-way valve 14 in an inserted manner, and the other end thereof is connected to the spraying pipeline 11 via the connector portion 16.

Figure 8:
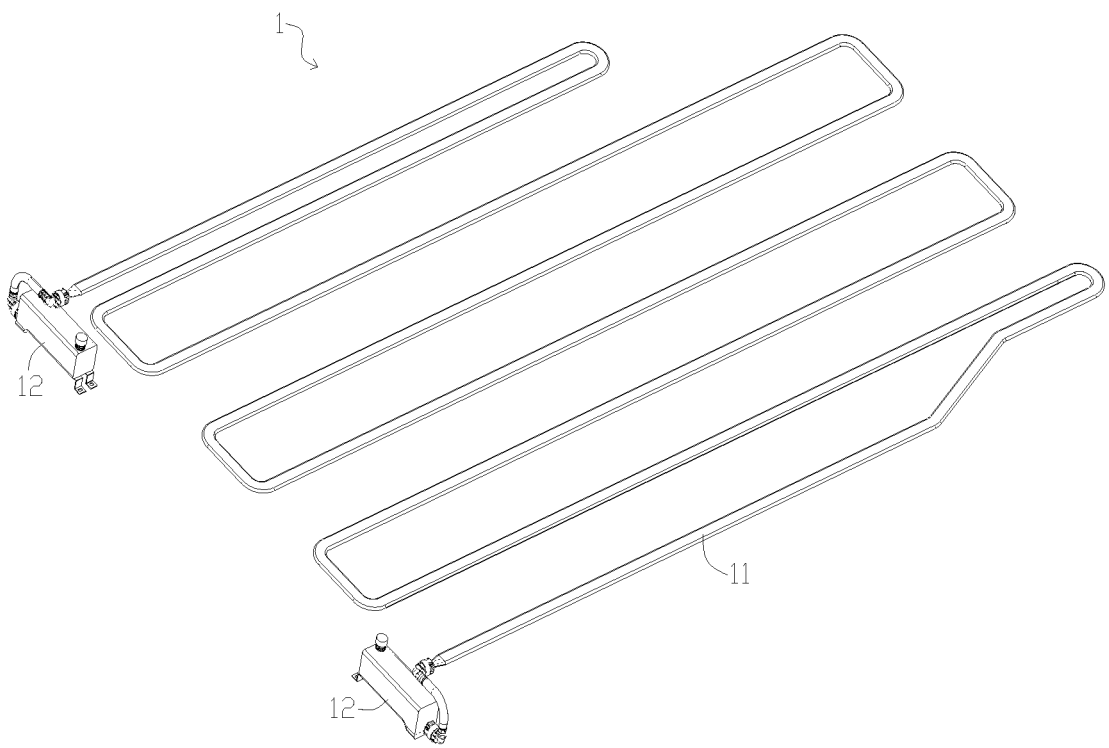
FIG. 8 is a schematic structural diagram of a second specific embodiment of a spraying system of a battery pack provided by the present application.
Figure 9:
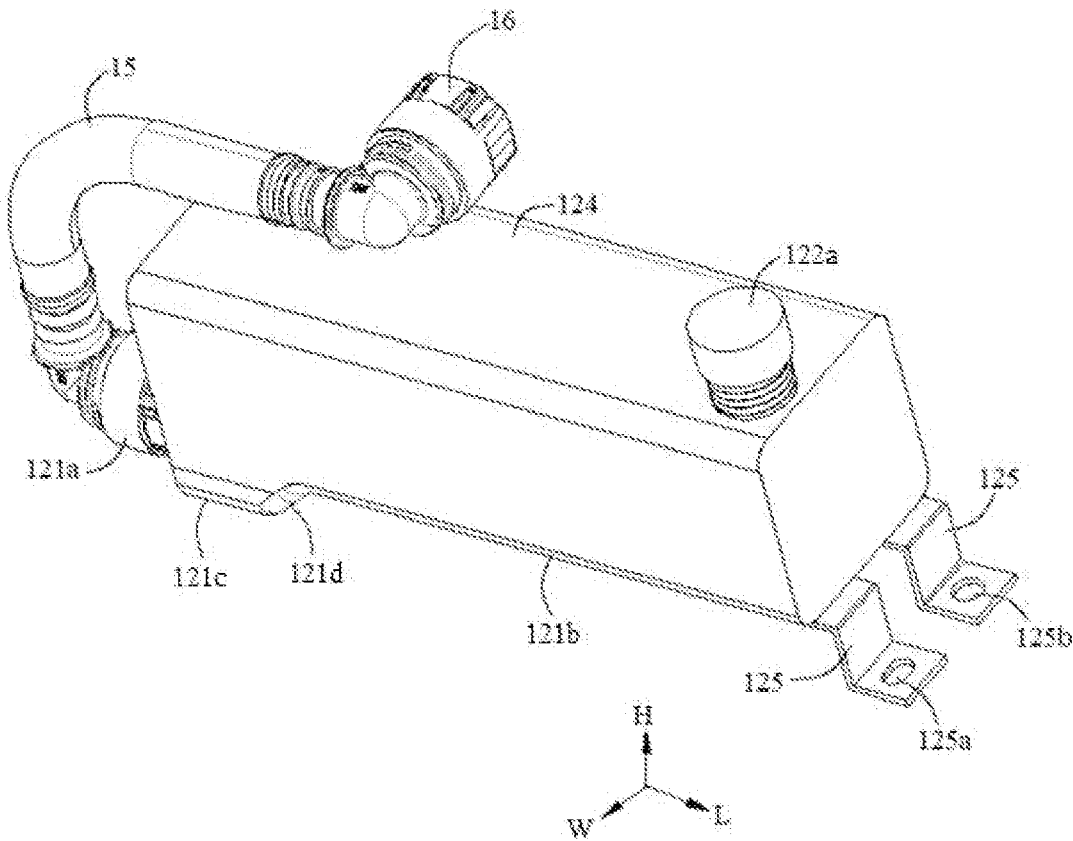
FIG. 9 is a schematic structural diagram of a fire-fighting fluid storage device and a connecting pipeline connected to each other in FIG. 8.
Figure 10:
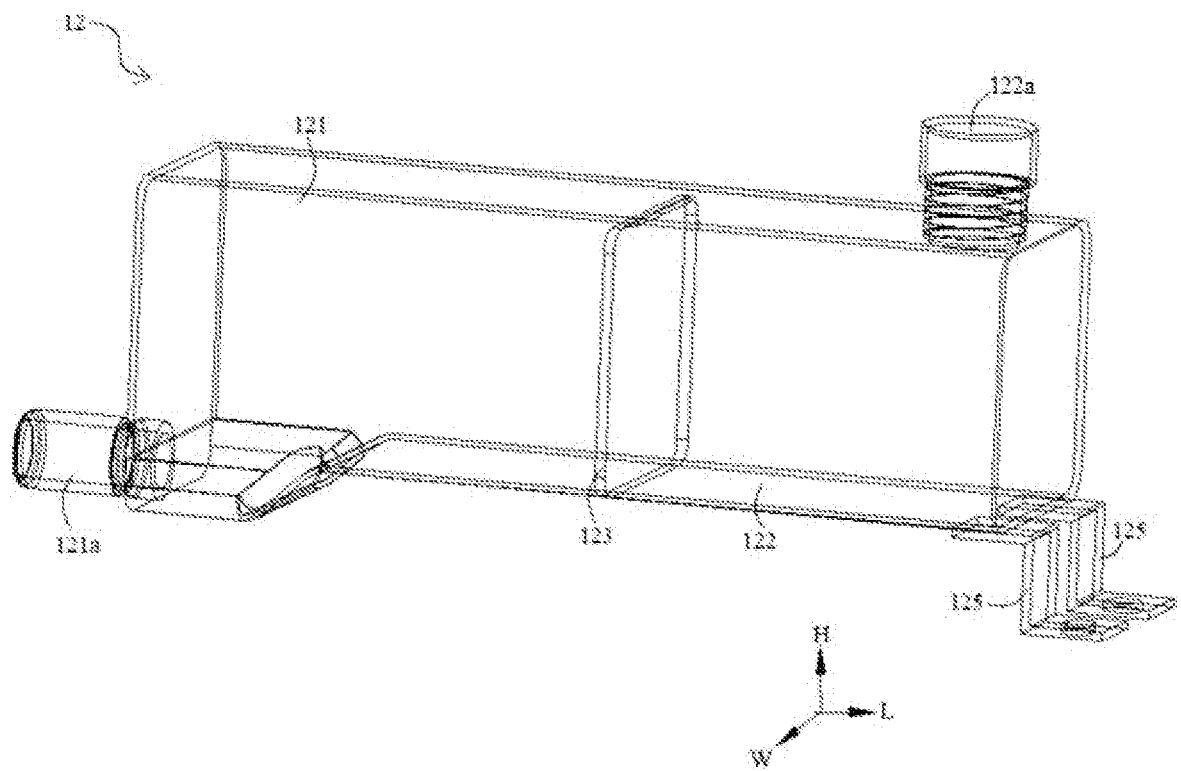
FIG. 10 is a perspective view of a first specific embodiment of the fire-fighting fluid storage device in FIG. 9.
Figure 11:
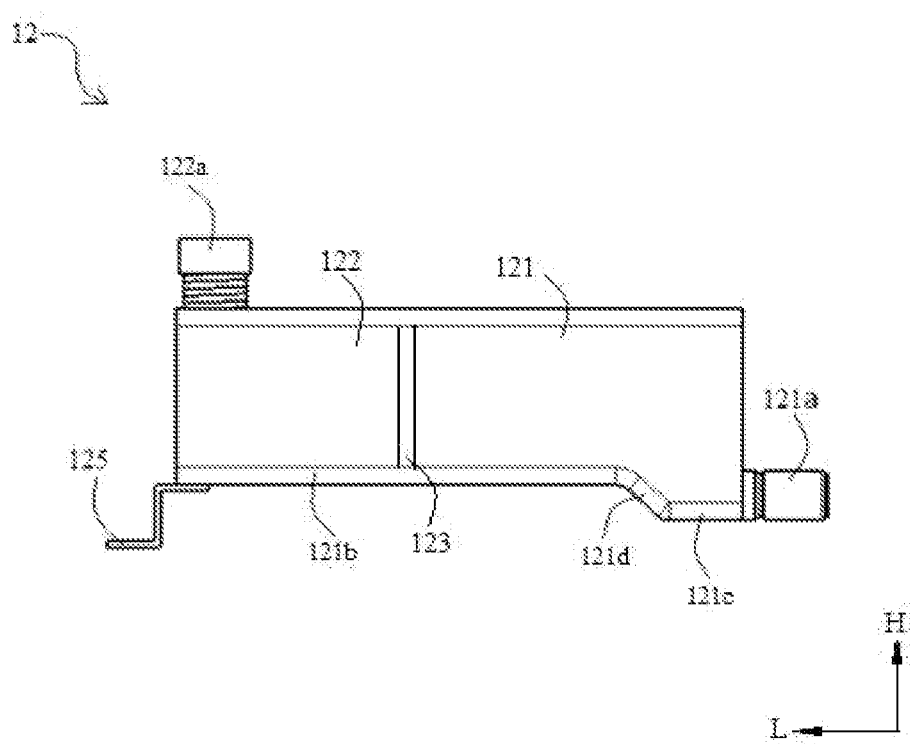
FIG. 11 is a front view of FIG. 10.
Figure 12:
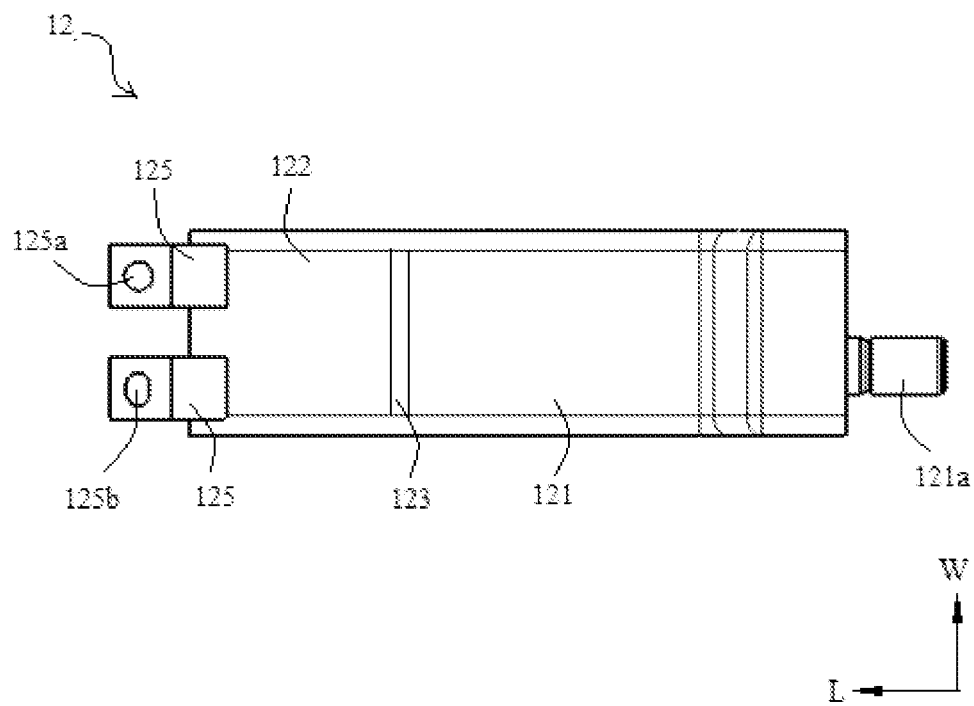
FIG. 12 is a bottom view of FIG. 10.
Figure 13:
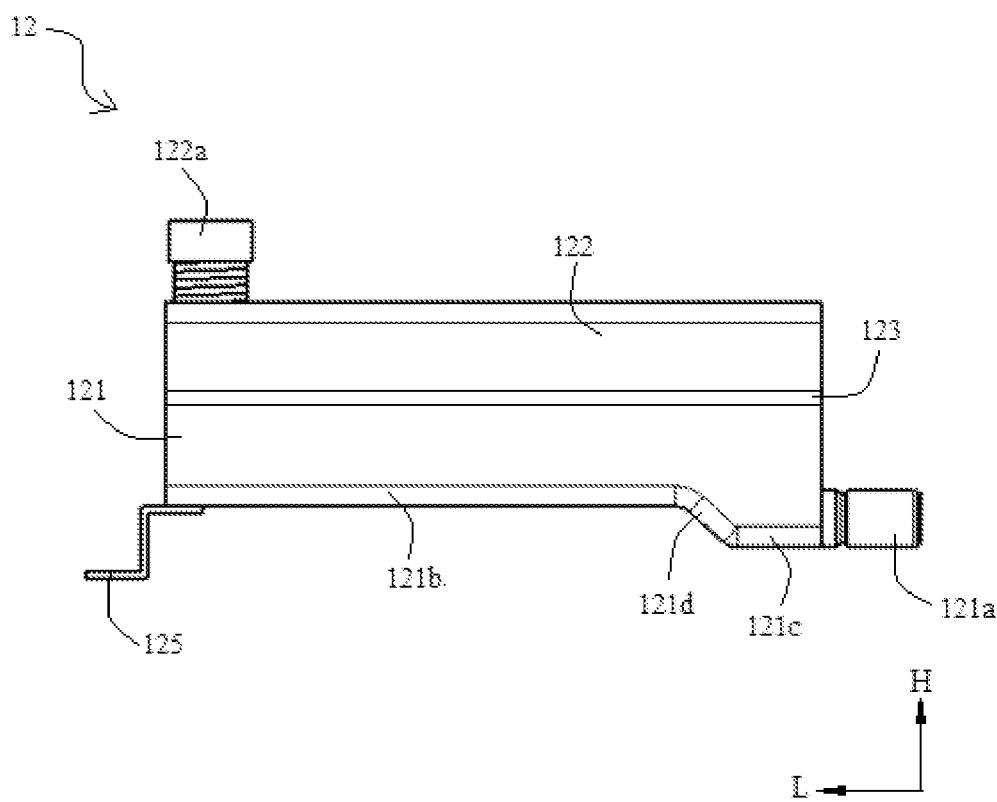
FIG. 13 is a front view of a second specific embodiment of the fire-fighting fluid storage device in FIG. 9.

With continuing reference to FIGS. 8-13, FIG. 8 is a schematic structural diagram of a second specific embodiment of a spraying system of a battery pack provided by the present application; FIG. 9 is a schematic structural diagram of a fire-fighting fluid storage device and a connecting pipeline connected to each other in FIG. 8; FIG. 10 is a perspective view of a first specific embodiment of the fire-fighting fluid storage device in FIG. 9; FIG. 11 is a front view of FIG. 10; FIG. 12 is a bottom view of FIG. 10; and FIG. 13 is a front view of a second specific embodiment of the fire-fighting fluid storage device in FIG. 9.

In the second specific embodiment of the spraying system, the spraying system 1 includes a spraying pipeline 11 and also includes a fire-fighting fluid storage device 12, where the fire-fighting fluid storage device 12 includes a tank 124, the tank 124 is provided with a fluid inlet 122a and a fluid outlet 121a, and the fluid inlet 122a is located above the fluid outlet 121a. Moreover, an inner cavity of the tank 124 is used to store a fire-fighting fluid and a gas, and the fire-fighting fluid in the inner cavity of the tank 124 can be discharged from the fluid outlet 121a under the action of the compressed gas. The fluid outlet 121a is in communication with the spraying pipeline 11.

In this embodiment, the fire-fighting fluid enters the inner cavity of the tank 124 through the fluid inlet 122a, and the compressed gas is then introduced from the fluid inlet 122a. The compressed gas is located in the space above the fire-fighting fluid, and the gas pressure acting on the fire-fighting fluid can be adjusted by adjust the amount of the compressed gas entering the tank 124. When no thermal runaway occurs in any unit battery 2 of the battery pack, the fire-fighting fluid in the fire-fighting fluid storage device 12 cannot enter the spraying pipeline 11 under the pressure of the fire-fighting fluid in the spraying pipeline 11. When thermal runaway occurs in a unit battery 2 of the battery pack, the spraying pipeline 11 forms an opening, and the fire-fighting fluid in spraying pipeline 11 is discharged from the opening. The fire-fighting fluid in fire-fighting fluid storage device 12 is pushed to enter the spraying pipeline 11 by the pressure of the compressed gas in the fire-fighting fluid storage device.

Therefore, in this embodiment, the fire-fighting fluid storage device 12 does not need to be provided with other components, and only relies on the difference in the characteristics of the fire-fighting fluid and the compressed gas, so that the compressed gas is located above the fire-fighting fluid, which can be understood as the fire-fighting fluid storage device 12 having a liquid storage portion (located at a lower portion) and a first gas storage portion (located at an upper portion), that is, the liquid storage portion and the first gas storage portion in this embodiment have an integrated structure.

In a third specific embodiment of the spraying system 1, as shown in FIG. 8, the spraying system 1 includes a fire-fighting fluid storage device 12. Specifically, as shown in FIG. 10, the fire-fighting fluid storage device 12 includes: a tank 124, the tank 124 having an inner cavity; a partition member 123, the partition member 123 being located in an inner cavity of the tank 124, and the partition member 123 dividing the inner cavity of the tank 124 into a liquid storage portion 121 and a first gas storage portion 122 as described above, where the liquid storage portion 121 is used to store a fire-fighting fluid, and the first gas storage portion 122 is used to store a compressed gas. Moreover, the liquid storage portion 121 has a fluid outlet 121*a*, the fluid outlet 121*a* being in communication with the spraying pipeline 11, and the first gas storage portion 122 has a fluid inlet 122*a*.

In the present application, when no thermal runaway occurs in any unit battery 2 of the battery pack, the fire-fighting fluid in the liquid storage portion 121 is not discharged from the fluid outlet 121*a*, and the acting force of the fire-fighting fluid in the liquid storage portion 121 on the partition member 123 is balanced with the acting force of the compressed gas in the first gas storage portion 122 on the partition member 123, so that the partition member 123 can be stationary at this position. When thermal runaway occurs in a unit battery of the battery pack, the spraying pipeline 11 can form an opening, and the fire-fighting fluid in the spraying pipeline 11 is discharged from the opening, such that part of the fire-fighting fluid in the liquid storage portion 121 enters the spraying pipeline 11, so that the amount of the fire-fighting fluid in the liquid storage portion 121 is reduced, the pressure decreases, the compressed gas in the first gas storage portion 122 drives the partition member 123 to move toward the liquid storage portion 121 and then drives the fire-fighting fluid in the liquid storage portion 121 to enter the spraying pipeline, and the fire-fighting fluid is sprayed from the opening of the spraying pipeline to prevent thermal diffusion.

Therefore, in the spraying system of the battery pack, the first gas storage portion 122 of the fire-fighting fluid storage device 12 is used as a driving device for the fire-fighting fluid. There is no need to additionally provide a monitoring device and a control device. That is, there is no need to provide a sensor in the spraying system, and spraying can be achieved through the relationship between the components of the spraying system, and the response speed is fast. Moreover, the fire-fighting fluid storage device 12 also has the advantages of simple structure and small footprint.

Specifically, in the first specific embodiment of the fire-fighting fluid storage device 12, as shown in FIGS. 10-13, the partition member 123 includes a partition plate, which is provided in the inner cavity of the tank 124 and can move relative to an inner wall of the tank 124 under the action of the compressed gas in the first gas storage portion 122, to push the fire-fighting fluid in the liquid storage portion 121 to move toward the fluid outlet 121*a*.

When the fire-fighting fluid is discharged from the opening of the spraying pipeline 11, the fire-fighting fluid in the liquid storage portion 121 enters the spraying pipeline 11 through the fluid outlet 121*a*, and the pushing force of the fire-fighting fluid in the liquid storage portion 121 on the partition member 123 is reduced. Under the action of the compressed gas in the first gas storage portion 122, the compressed gas can push the partition member 123 to move in the direction of the liquid storage portion 121, thereby reducing the volume of the liquid storage portion 121 and increasing the volume of the first gas storage portion 122, and during the movement of the partition member 123, the liquid in the liquid storage portion 121 can be pushed to continue to be discharged from the fluid outlet 121*a*. Therefore, in this embodiment, the fire-fighting fluid in the liquid storage portion 121 is discharged by means of the movement of the partition member 123.

More specifically, a slidable sealing member is provided between an outer peripheral wall of the partition plate and the inner wall of the tank 124. By providing the slidable sealing member, the partition member 123 can move relative to the inner wall of the tank 124, and the slidable sealing member can also have a sealing function, reducing the risk of the fire-fighting fluid and/or the compressed gas flowing between the outer peripheral wall of partition member 123 and the inner wall of tank 124, thereby improving the sensitivity of the movement of the partition member 123.

For example, the slidable sealing member may have a structure such as a packing seal.

In another aspect, in the embodiment shown in FIGS. 10-12, in the tank 124, the liquid storage portion 121 and the first gas storage portion 122 are distributed in a lengthwise direction L of the tank 124, and the partition member 123 can be moved in the lengthwise direction L of the tank 124. During the movement of the partition member 123, the volume of the liquid storage portion 121 can be reduced, and the volume of the first gas storage portion 122 can be increased, such that under the pushing action of the partition member 123, the liquid in the liquid storage portion 121 can be discharged from the fluid outlet 121*a*. Moreover, as the volume of the first gas storage portion 122 increases, the pushing force of the compressed gas on the partition member 123 is reduced accordingly. In order to further increase the velocity and the flow rate of the liquid discharged from the fluid outlet 121*a*, the compressed gas may continue to be introduced through the fluid inlet 122*a* provided in the first gas storage portion 122, such that the liquid discharges from the fluid outlet 121*a* with a higher flow velocity and a larger flow rate, so as to meet the use requirements of the battery pack.

In the embodiment shown in FIG. 13, the liquid storage portion 121 and the first gas storage portion 122 are distributed in a height direction H of the tank 124, and the liquid storage portion 121 is located below the first gas storage portion 122. Moreover, the partition member 123 can move in the height direction H of the tank 124. Specifically, in the solution of this embodiment, the partition member 123 can move downwardly along the inner wall of the tank 124, thereby reducing the volume of the liquid storage portion 121 and increasing the volume of the first gas storage portion 122 during the movement, to push the liquid out of the fluid outlet 121*a*. Moreover, the compressed gas may continue to be introduced through the fluid inlet 122*a*.

In the above three embodiments, the partition member 123 is a plate-like structure, and when it is provided in the inner cavity of the tank 124, the inner cavity of the liquid storage portion 121 and the inner cavity of the first gas storage portion 122 are regular-shaped structures. Of course, the partition member 123 may also have other shapes. For example, the partition member 123 may be a structure that is bent multiple times, and when it is located in the inner cavity of the tank 124, the inner cavity of the liquid storage portion 121 and the inner cavity of the first gas storage portion 122 are both irregular, and the distribution of the two is also not limited.

In addition, in the above three embodiments, the tank 124 is a structure with the same cross-sectional area (for example, a cuboid structure), such that the partition member 123 is not restricted during the movement. When the cross-sectional area of the tank 124 changes (for example, the tank 124 is a spherical Structure), the partition member 123 needs to adapt to the change of the cross-sectional area of the tank 124 during the movement. For example, the partition member 123 may be a telescopic structure.

In another specific embodiment, the partition member 123 includes a diaphragm, which can expand under the action of the compressed gas in the first gas storage portion 122, to push the fire-fighting fluid in the liquid storage portion 121 to move toward the fluid outlet 121*a*.

In this embodiment, if thermal runaway occurs in a unit battery of the battery pack, when the fire-fighting fluid is discharged from the opening of the spraying pipeline, the fire-fighting fluid in the liquid storage portion 121 enters the spraying pipeline through the fluid outlet 121a, and the acting force of the fire-fighting fluid in the liquid storage portion 121 on the diaphragm is reduced. Under the action of the compressed gas in the first gas storage portion 122, the diaphragm expands, such that the fire-fighting fluid in the liquid storage portion 121 can be pushed to flow in the direction of the fluid outlet 121a. Therefore, in this embodiment, the fire-fighting fluid in the liquid storage portion 121 is discharged by means of the expansion of the partition member 123.

The diaphragm may be an EPDM diaphragm.

In another aspect, in the above embodiments, in order to facilitate the discharge of the fire-fighting fluid from the fluid outlet 121a, the fluid outlet 121a should be located below the fluid inlet 122a.

As shown in FIGS. 11 and 13, a liquid storage bottom wall of the liquid storage portion 121 includes a first planar portion 121b and an inclined portion 121d, where the inclined portion 121d is inclined downward with respect to the first planar portion 121b, and therefore, for the liquid storage portion 121, the downwardly-inclined inclined portion 121d forms a recessed structure, which is located below other positions of the tank 124. In this case, the fluid outlet 121a is provided on a liquid storage side wall of the liquid storage portion 121, and the fluid outlet 121a is located below the first planar portion 121b, that is, the fluid outlet 121a corresponds to the recessed structure.

In this embodiment, after the bottom of the liquid storage portion 121 is provided with the inclined portion 121d and the recessed structure is formed, the liquid in the liquid storage portion 121 has a tendency to flow toward the recessed structure under the action of gravity, and when the fluid outlet 121a is arranged at the recessed structure, the discharge of the liquid from the fluid outlet 121a can be promoted. More importantly, the amount of the fire-fighting fluid remaining in the liquid storage portion 121 can be reduced, thereby improving the spraying effect and the utilization rate of the fire-fighting fluid.

Therefore, in this embodiment, after the inclined portion 121d is provided, the discharge of liquid from the fluid outlet 121a can be promoted, and the residual amount of liquid can be reduced. Moreover, there is no need to provide a fluid outlet 121a at the bottom of the liquid storage portion 121, so that a bottom surface of the tank 124 can be used as a mounting surface, thereby improving the mounting flexibility and reducing the mounting difficulty.

Further, shown in FIGS. 11 and 13, the bottom wall of the liquid storage portion 121 further includes a second planar portion 121c, where the second planar portion 121c is located below the first planar portion 121b, and the first planar portion 121b and the second planar portion 121c are connected via the inclined portion 121d. The second planar portion 121c is also connected to the liquid storage side wall of the liquid storage portion 121. Therefore, the second planar portion 121c is located below the other parts of the tank 124.

Moreover, a mounting portion 125 is connected to an outer side of the tank 124, and the mounting portion 125 may be configured to be mounted to the housing of the battery pack. As shown in FIG. 1, the mounting portion 125 extends below the tank 124.

In this embodiment, since the second planar portion 121c and the mounting portion 125 both extend downward relative to the tank 124, the two may be used as a mounting structure of the fire-fighting fluid storage device 12, where the second planar portion 121c may be supported on an external device, and the mounting portion 125 may be connected to the external device via a bolt, so that the mounting reliability of the fire-fighting fluid storage device 12 can be improved by means of the auxiliary support of the second planar portion 12c.

Specifically, the second planar portion 121c may be or may not be flush with a flat mounting surface of the mounting portion 125, and may be arranged according to the specific mounting environment.

Moreover, the height of the mounting portion 125 is greater than that of the inclined portion 121d.

Specifically, as shown in FIG. 3, the mounting portion 125 has a first mounting hole 125a and a second mounting hole 125b, which are used to connect to the external device via bolts or pins, and one of the first mounting hole 125a and the second mounting hole 125b is a round hole, and the other thereof is a waist-shaped hole. The waist-shaped hole is used to fine-tune the position of the fire-fighting fluid storage device 12, or to adapt to errors generated in the manufacturing and assembly processes. The round hole is used to connect to the external device.

In addition, as shown in FIGS. 11 and 13, the mounting portion 125 is provided on one side of the fluid inlet 121 so as to provide support by the mounting portion 125 to withstand the greater pressure at the fluid inlet 121.

The above description merely relates to preferred embodiments of the present application, and are not intended to limit the present application. Any modifications, equivalent replacements, improvements, etc. made within the spirit and principles of the present application should be included within the scope of protection of the present application.

What is claimed is:

1. A battery pack, comprising:
    a housing having an inner cavity;
    a unit battery provided in the inner cavity of the housing, the unit battery being provided with an explosion-proof valve; and
    a spraying system which comprises:
    a spraying pipeline configured to circulate a fire-fighting fluid, the spraying pipeline being capable of broken and forming an opening after being heated;
    a first gas storage portion configured to store a compressed gas;
    a liquid storage portion; and
    a fire-fighting fluid storage device;
    wherein the compressed gas in the first gas storage portion is capable of driving the fire-fighting fluid in the spraying pipeline to be discharged under the action of gas pressure, and the spraying pipeline of the spraying system is arranged corresponding to the explosion-proof valve;
    wherein the compressed gas in the first gas storage portion is further capable of driving the fire-fighting fluid in the liquid storage portion to enter the spraying pipeline under the action of gas pressure;
    wherein the fire-fighting fluid storage device comprises:
    a tank having an inner cavity; and
    a partition member located in the inner cavity of the tank, the partition member dividing the tank into the liquid storage portion and the first gas storage portion,
    wherein the liquid storage portion has a fluid outlet, the fluid outlet being in communication with the spraying pipeline, and the first gas storage portion is configured to have a fluid inlet; and
    the partition member is capable of driving the fire-fighting fluid in the liquid storage portion to move toward the fluid outlet under the action of the compressed gas in the first gas storage portion;

wherein a liquid storage bottom wall of the liquid storage portion comprises a first planar portion and an inclined portion; and wherein the battery pack further comprises a mounting portion connected to an outer side of the tank, a height of the mounting portion is greater than that of the inclined portion; and the mounting portion is provided on one side of the fluid inlet so as to provide support by the mounting portion to withstand the greater pressure at the fluid inlet.

2. The battery pack according to claim 1, wherein the first gas storage portion and the liquid storage portion are arranged separately but are in communication with each other, and the compressed gas in the first gas storage portion is capable of entering the liquid storage portion.

3. The battery pack according to claim 2, comprising two liquid storage portions, wherein the two liquid storage portions are respectively in communication with two ends of the spraying pipeline; and the first gas storage portion is in communication with the two liquid storage portions.

4. The battery pack according to claim 2, comprising two liquid storage portions and two first gas storage portions, wherein one end of each of the two liquid storage portions is respectively in communication with either end of the spraying pipeline, and the other end of each of the two liquid storage portions is respectively in communication with either of the two first gas storage portions.

5. The battery pack according to claim 2, comprising one liquid storage portion and one first gas storage portion, and further comprising one second gas storage portion, wherein one end of the spraying pipeline is in communication with the liquid storage portion, and the other end thereof is in communication with the second gas storage portion.

6. The battery pack according to claim 2, wherein a flow valve is provided between the first gas storage portion and the liquid storage portion; and a one-way valve is provided between the first gas storage portion and the liquid storage portion.

7. The battery pack according to claim 5, wherein a flow valve is provided between the first gas storage portion and the liquid storage portion, and a flow valve is provided between the second gas storage portion and the spraying pipeline; and a one-way valve is provided between the first gas storage portion and the liquid storage portion, and the one-way valve is provided between the second gas storage portion and the spraying pipeline.

8. The battery pack according to claim 1, comprising a fire-fighting fluid storage device, wherein the fire-fighting fluid storage device comprises a tank provided with a fluid inlet and a fluid outlet;

the fluid inlet is located above the fluid outlet; and an inner cavity of the tank is configured to store a fire-fighting fluid and a compressed gas, and the fire-fighting fluid in the inner cavity of the tank is capable of being discharged from the fluid outlet under the action of the compressed gas.

9. The battery pack according to claim 1, wherein the partition member comprises a partition plate and is capable of moving relative to an inner wall of the tank under the action of the compressed gas in the first gas storage portion, to push the fire-fighting fluid in the liquid storage portion to move toward the fluid outlet; and a slidable sealing member is provided between an outer peripheral wall of the partition plate and the inner wall of the tank.

10. The battery pack according to claim 1, wherein the partition member comprises a diaphragm, which is capable of expanding under the action of the compressed gas in the first gas storage portion, to push the fire-fighting fluid in the liquid storage portion to move toward the fluid outlet.

11. The battery pack according to claim 9, wherein the liquid storage portion and the first gas storage portion are distributed in a lengthwise direction L of the tank, and the partition member is capable of moving in the lengthwise direction L of the tank.

12. The battery pack according to claim 9, wherein the liquid storage portion and the first gas storage portion are distributed in a height direction H of the tank, and the liquid storage portion is located below the first gas storage portion; and the partition member is capable of moving in the height direction H of the tank.

13. The battery pack according to claim 1, wherein the fire-fighting fluid in the spraying pipeline and the liquid storage portion is fluorinated liquid.

* * * * *